(12) United States Patent
Shutou et al.

(10) Patent No.: US 8,072,567 B2
(45) Date of Patent: Dec. 6, 2011

(54) LIQUID CRYSTAL PANEL AND LIQUID CRYSTAL DISPLAY APPARATUS USING THE SAME

(75) Inventors: Shunsuke Shutou, Osaka (JP); Masato Bitou, Osaka (JP); Youji Ishihara, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 410 days.

(21) Appl. No.: 12/519,036

(22) PCT Filed: Dec. 4, 2007

(86) PCT No.: PCT/JP2007/073378
§ 371 (c)(1),
(2), (4) Date: Jun. 12, 2009

(87) PCT Pub. No.: WO2008/078514
PCT Pub. Date: Jul. 3, 2008

(65) Prior Publication Data
US 2009/0268137 A1     Oct. 29, 2009

(30) Foreign Application Priority Data

Dec. 25, 2006  (JP) ................. 2006-347714

(51) Int. Cl.
*G02F 1/1335* (2006.01)

(52) U.S. Cl. ..................... 349/118; 349/119
(58) Field of Classification Search ......... 349/96, 349/115, 116, 117, 118, 119
See application file for complete search history.

(56) References Cited

U.S. PATENT DOCUMENTS

| | | |
|---|---|---|
| 6,281,952 B1 | 8/2001 | Okamoto et al. |
| 6,563,554 B2 | 5/2003 | Okamoto et al. |
| 6,593,982 B2 | 7/2003 | Yoon et al. |
| 6,717,637 B1 | 4/2004 | Yoon et al. |
| 6,900,863 B2 | 5/2005 | Okamoto et al. |
| 6,930,740 B2 | 8/2005 | Yoon et al. |
| 7,050,132 B2 | 5/2006 | Okamoto et al. |
| 7,126,754 B2 * | 10/2006 | Yamaoka et al. ........ 359/485.03 |
| 7,227,602 B2 | 6/2007 | Jeon et al. |
| 7,394,511 B2 | 7/2008 | Okamoto et al. |

(Continued)

FOREIGN PATENT DOCUMENTS

CN        1683972 A      10/2005

(Continued)

OTHER PUBLICATIONS

International Search Report of PCT/JP2007/073378, Mailing Date of Jan. 15, 2008.

(Continued)

*Primary Examiner* — Akm Ullah
(74) *Attorney, Agent, or Firm* — Westerman, Hattori, Daniels & Adrian, LLP (57) ABSTRACT

A liquid crystal panel of the present invention includes in the following order toward a viewer side: a first polarizer; a first optical compensation layer having a refractive index ellipsoid of nx>ny>nz and an in-plane retardation $Re_1$ of 90 to 300 nm; a liquid crystal cell; a second optical compensation layer having a refractive index ellipsoid of nx>ny>nz and an in-plane retardation $Re_2$ of 90 to 300 nm; and a second polarizer, wherein a total thickness direction retardation $\Sigma Rth_{1\ to\ n}$ of all the optical compensation layers and a thickness direction retardation $Rth_c$ of the liquid crystal cell satisfy the following Expression (1):

$$-160\ \text{nm} < (\Sigma Rth_{1\ to\ n} - Rth_c) < 50\ \text{nm} \quad (1).$$

7 Claims, 9 Drawing Sheets

U.S. PATENT DOCUMENTS

| | | |
|---|---|---|
| 7,423,714 B2 * | 9/2008 | Chiba et al. ............... 349/119 |
| 7,462,381 B2 * | 12/2008 | Yoshimi et al. ............ 428/1.1 |
| 7,522,238 B2 * | 4/2009 | Matsuoka .................. 349/117 |
| 7,538,836 B2 | 5/2009 | Fujita et al. |
| 7,557,883 B2 * | 7/2009 | Kawamoto et al. ......... 349/119 |
| 7,630,038 B2 * | 12/2009 | Takeda et al. ............. 349/117 |
| 7,695,780 B2 * | 4/2010 | Ohgaru et al. ............. 428/1.31 |
| 7,738,065 B2 * | 6/2010 | Shutou et al. ............. 349/119 |
| 8,018,556 B2 * | 9/2011 | Nagai ....................... 349/118 |
| 2001/0007487 A1 | 7/2001 | Yoon et al. |
| 2001/0048497 A1 | 12/2001 | Miyachi et al. |
| 2001/0052948 A1 | 12/2001 | Okamoto et al. |
| 2002/0047968 A1 * | 4/2002 | Yoshida et al. ............ 349/117 |
| 2003/0067570 A1 | 4/2003 | Okamoto et al. |
| 2003/0210362 A1 | 11/2003 | Yoon et al. |
| 2004/0160537 A1 | 8/2004 | Okamoto et al. |
| 2004/0183973 A1 * | 9/2004 | Roska et al. .............. 349/117 |
| 2004/0252264 A1 * | 12/2004 | Shimizu .................... 349/117 |
| 2005/0062917 A1 | 3/2005 | Kashima |
| 2005/0112299 A1 * | 5/2005 | Shimizu et al. ........... 428/1.31 |
| 2005/0140900 A1 | 6/2005 | Jeon et al. |
| 2005/0231660 A1 | 10/2005 | Fujita et al. |
| 2005/0243248 A1 | 11/2005 | Yoon et al. |
| 2006/0007375 A1 * | 1/2006 | Nagashima et al. ....... 349/117 |
| 2006/0062934 A1 * | 3/2006 | Hayashi et al. ........... 428/1.31 |
| 2006/0119752 A1 | 6/2006 | Okamoto et al. |
| 2006/0203162 A1 * | 9/2006 | Ito et al. ................... 349/117 |
| 2007/0222919 A1 | 9/2007 | Chiba et al. |
| 2008/0036954 A1 | 2/2008 | Takahashi et al. |
| 2008/0170186 A1 | 7/2008 | Okamoto et al. |
| 2009/0040443 A1 * | 2/2009 | Hada et al. ............... 349/118 |
| 2010/0026936 A1 | 2/2010 | Uesaka et al. |

FOREIGN PATENT DOCUMENTS

| | | |
|---|---|---|
| JP | 9-325212 A | 12/1997 |
| JP | 10-068816 A | 3/1998 |
| JP | 11-242226 A | 9/1999 |
| JP | 2000-227520 A | 8/2000 |
| JP | 3174367 B2 | 6/2001 |
| JP | 2001-209065 A | 8/2001 |
| JP | 2002-055342 A | 2/2002 |
| JP | 2003-075635 A | 3/2003 |
| JP | 2004-326089 A | 11/2004 |
| JP | 2006-154436 A | 6/2006 |
| JP | 2006-195441 A | 7/2006 |
| JP | 2006-215221 A | 8/2006 |
| JP | 2006-309130 A | 11/2006 |
| JP | 2007-286578 A | 11/2007 |
| JP | 2008-129175 A | 6/2008 |
| KR | 10-0677050 B1 | 1/2007 |
| WO | 2006-059545 A1 | 6/2006 |

OTHER PUBLICATIONS

Korean Office Action dated Feb. 21, 2011, issued in Korean Patent Application No. 2009-0029977.

International Search Report PCT/JP2007/071006, Mailing date of Jan. 22, 2008.

Japanese Office Action dated Feb. 16, 2011, issued in Japanese Patent Application No. 2007-259012.

International Search Report of PCT/JP2007/070585, mailing date of Dec. 11, 2007.

Japanese Office Action dated Apr. 27, 2011, issued in Japanese Patent Application No. 2007-259012.

* cited by examiner

Equal contrast ratio contour

Equal contrast ratio contour

Fig.7

Equal contrast ratio contour

LIQUID CRYSTAL PANEL AND LIQUID CRYSTAL DISPLAY APPARATUS USING THE SAME

TECHNICAL FIELD

The present invention relates to a liquid crystal panel and a liquid crystal display apparatus using the same. More specifically, the present invention relates to a liquid crystal panel excellent in the balance between contrast and viewing angle properties, and a liquid crystal display apparatus using the liquid crystal panel.

BACKGROUND ART

As a liquid crystal display apparatus of a VA mode, a semi-transmission reflection-type liquid crystal display apparatus has been proposed in addition to a transmission-type liquid crystal display apparatus and a reflection-type liquid crystal display apparatus (for example, see Patent Documents 1 and 2). The semi-transmission reflection-type liquid crystal display apparatus enables a display to be recognized visually by using ambient light in a light place in the same way as in the reflection-type liquid crystal display apparatus, and using an internal light source such as a backlight in a dark place. In other words, the semi-transmission reflection-type liquid crystal display apparatus employs a display system that has both a reflection-type system and a transmission-type system, and switches a display mode between a reflection mode and a transmission mode depending upon the ambient brightness. As a result, the semi-transmission reflection-type liquid crystal display apparatus can perform a clear display even in a dark place with the reduction of the power consumption. Therefore, the semi-transmission reflection-type liquid crystal display apparatus may be used preferably for a display part of mobile equipment.

A specific example of such a semi-transmission reflection-type liquid crystal display apparatus includes a liquid crystal display apparatus that includes a reflective film, which is obtained by forming a window portion for transmitting light on a film made of metal such as aluminum, on an inner side of a lower substrate, and allows the reflective film to function as a semi-transmission reflection plate. In the liquid crystal display apparatus described above, in the case of the reflection mode, ambient light entered from an upper substrate side passes through a liquid crystal layer, is reflected by the reflective film on the inner side of the lower substrate, passes through the liquid crystal layer again, and outgoes from an upper substrate side, thereby contributing to a display. On the other hand, in the case of transmission mode, light which is emitted from the backlight and entered from the lower substrate side passes through the window portion of the reflective film and the liquid crystal layer, and outgoes from the upper substrate side, thereby contributing to a display. Thus, in a region where the reflective film is formed, a region in which the window portion is formed functions as a transmission display region, and the other region functions as a reflection display region.

However, in the conventional liquid crystal display apparatus of a VA mode (in particular, reflection-type or semi-transmission reflection-type liquid crystal display apparatus), there is a problem in that light leakage occurs in a black display to cause degradation of a contrast, which has not been overcome for a long time.
Patent Document 1: JP 11-242226 A
Patent Document 2: JP 2001-209065 A

DISCLOSURE OF THE INVENTION

Problems to be Solved by the Invention

The present invention has been made in view of solving the above conventional problem, and an object of the present invention is to provide a liquid crystal panel excellent in the balance between contrast and viewing angle properties, and a liquid crystal display apparatus using the liquid crystal panel.

Means for Solving the Problems

A liquid crystal panel according to an embodiment of the invention includes in the following order toward a viewer side: a first polarizer; a first optical compensation layer having a refractive index ellipsoid of nx>ny>nz and an in-plane retardation $Re_1$ of 90 to 300 nm; a liquid crystal cell; a second optical compensation layer having a refractive index ellipsoid of nx>ny>nz and an in-plane retardation $Re_2$ of 90 to 300 nm; and a second polarizer, wherein a total thickness direction retardation $\Sigma Rth_{1\ to\ n}$ of all the optical compensation layers and a thickness direction retardation $Rth_c$ of the liquid crystal cell satisfy the following Expression (1):

$$-160\ \text{nm} < (\Sigma Rth_{1\ to\ n} - Rth_c) < 50\ \text{nm} \quad (1).$$

In a preferred embodiment of the invention, the total thickness direction retardation $\Sigma Rth_{1\ to\ n}$ of all the optical compensation layers and the thickness direction retardation $Rth_c$ of the liquid crystal cell satisfy the following Expression (2):

$$-160\ \text{nm} < (\Sigma Rth_{1\ to\ n} - Rth_c) < 20\ \text{nm} \quad (2).$$

In another preferred embodiment of the invention, the liquid crystal cell is in a VA mode.

According to another aspect of the invention, a liquid crystal display apparatus is provided. The liquid crystal display apparatus includes the liquid crystal panel.

Effects of the Invention

As described above, according to the present invention, by optimizing the relationship between the thickness direction retardation of a liquid crystal cell and the thickness direction retardation of all optical compensation layers in a liquid crystal panel having a liquid crystal cell and at least two optical compensation layers, the liquid crystal panel remarkably excellent in the balance between the contrast and the viewing angle properties may be obtained.

DESCRIPTION OF SYMBOLS 100 liquid crystal panel
10 first polarizer
20 first optical compensation layer
30 second optical compensation layer
40 liquid crystal cell
10' second polarizer
41, 41' substrate
42 liquid crystal layer

BEST MODE FOR CARRYING OUT THE INVENTION

Definitions of Terms and Symbols

The definitions of terms and symbols of the specification of the present invention are as follows.

(1) The symbol "nx" refers to a refractive index in a direction providing a maximum in-plane refractive index (that is, a slow axis direction), the symbol "ny" refers to a refractive index in a direction perpendicular to the slow axis in the same plane (that is, a fast axis direction), and the symbol "nz" refers to a refractive index in a thickness direction.

(2) The term "in-plane retardation Re" refers to an in-plane retardation value of a film (layer) measured at 23° C. by using light having a wavelength of 590 nm as far as not specified, particularly. Re can be determined from an equation Re=(nx−ny)×d, where nx and ny represent refractive indices of a film (layer) at a wavelength of 590 nm in a slow axis direction and a fast axis direction, respectively, and d (nm) represents a thickness of the film (layer).

(3) The term "thickness direction retardation Rth" refers to a thickness direction retardation value measured at 23° C. by using light of a wavelength of 590 nm as far as not specified, particularly. Rth can be determined from an equation Rth={(nx+ny)/2−nz}×d, where nx, ny, and nz represent refractive indices of a film (layer) at a wavelength of 590 nm in a slow axis direction, a fast axis direction, and a thickness direction, respectively, and d (nm) represents a thickness of the film (layer).

(4) The subscripts "1", "2", "n", and "c" attached to terms or symbols described in the specification of the present invention represent a first optical compensation layer, a second optical compensation layer, an n-th optical compensation layer, and a liquid crystal cell, respectively.

(5) $\Sigma Rth_{1\ to\ n}$ in the above Expressions (1) and (2) represents the total thickness direction retardation from the first optical compensation layer to the n-th optical compensation layer. Thus, when the liquid crystal panel of the present invention has two optical compensation layers, assuming that the thickness retardations of the first optical compensation layer and the second optical compensation layer are represented by $Rth_1$ and $Rth_2$, respectively, $\Sigma Rth_{1\ to\ n}$ is expressed as follows:

$$\Sigma Rth_{1\ to\ n} = Rth_1 + Rth_2.$$

When the liquid crystal panel of the present invention further includes a third optical compensation layer, $\Sigma Rth_{1\ to\ n}$ is expressed as follows:

$$\Sigma Rth_{1\ to\ n} = Rth_1 + Rth_2 + Rth_3.$$

(6) The term "λ/2 plate" refers to a plate having a function of converting linearly polarized light having a specific vibration direction into linearly polarized light having a vibration direction perpendicular thereto, or converting right-handed circularly polarized light into left-handed circularly polarized light (or converting left-handed circularly polarized light into right-handed circularly polarized light). The λ/2 plate has an in-plane retardation value of a film (layer) of about ½ of a predetermined light wavelength (generally, in a visible light region).

(7) The term "λ/4 plate" refers to a plate having a function of converting linearly polarized light of a specific wavelength into circularly polarized light (or converting circularly polarized light into linearly polarized light). The λ/4 plate has an in-plane retardation value of a film (layer) of about ¼ of a predetermined light wavelength (generally, in a visible light region).

A. Entire Configuration of Liquid Crystal Panel

Figure 1:
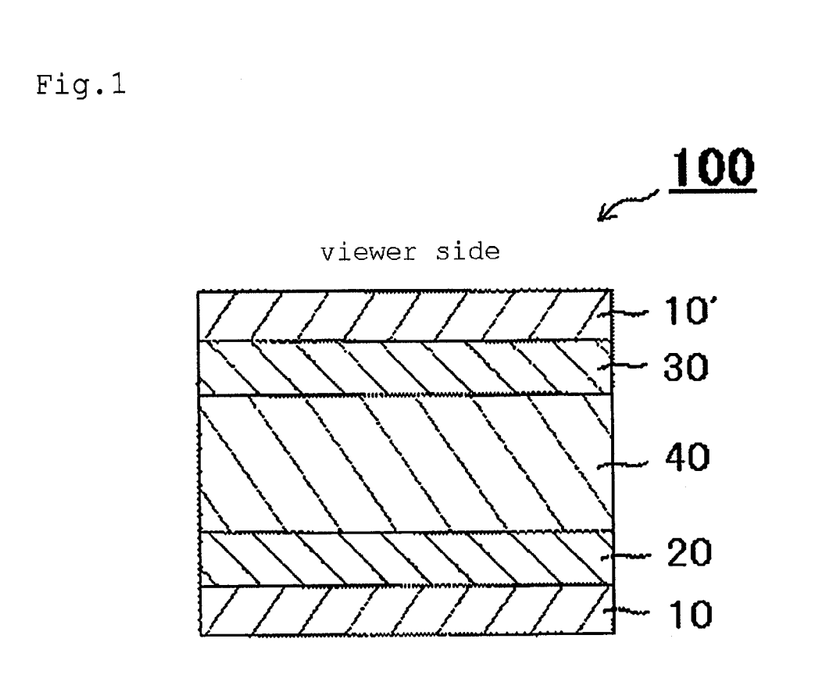
FIG. 1 Schematic cross-sectional view of a liquid crystal panel according to a preferred embodiment of the present invention.

The liquid crystal panel of the present invention may be applied preferably to any of transmission-type, reflection-type, and semi-transmission-type liquid crystal display apparatuses. FIG. 1 is a schematic cross-sectional view of a liquid crystal panel according to a preferred embodiment of the present invention. A liquid crystal panel 100 includes a first polarizer 10, a first optical compensation layer 20, a liquid crystal cell 40, a second optical compensation layer 30, and a second polarizer 10' in this order toward a viewer side. The first optical compensation layer 20 has a refractive index ellipsoid of nx>ny>nz and an in-plane retardation $Re_1$ of 90 to 300 nm. The second optical compensation layer 30 has a refractive index ellipsoid of nx>ny>nz and an in-plane retardation $Re_2$ of 90 to 300 nm. In the present invention, the total thickness direction retardation $\Sigma Rth_{1\ to\ n}$ of all the optical compensation layers and the thickness direction retardation $Rth_c$ of the liquid crystal cell satisfy the following Expression (1):

$$-160\ nm < (\Sigma Rth_{1\ to\ n} - Rth_c) < 50\ nm \qquad (1).$$

The respective constituent elements constituting the liquid crystal panel are laminated typically via any suitable pressure-sensitive adhesive layer or adhesive layer (not shown). Practically, any suitable protective film (not shown) is placed on a side of the first and second polarizers 10 and 10' where the optical compensation layers are not formed. Further, if required, a protective film may be placed between the polarizer and the optical compensation layer.

The first polarizer 10 and the second polarizer 10' are typically placed so that the absorption axes thereof are perpendicular to each other. In one embodiment, the absorption axis of the first polarizer is placed at an angle of 20° with respect to the horizontal direction of the liquid crystal panel. In another embodiment, the absorption axis of the first polarizer is placed in parallel to the horizontal direction of the liquid crystal panel. The first optical compensation layer 20 is placed so that the slow axis thereof forms an angle of preferably 37° to 52°, more preferably 40° to 50°, particularly preferably 42° to 48°, and most preferably about 45° with respect to the absorption axis of the first polarizer 10. The second optical compensation layer 30 is placed so that the slow axis thereof forms an angle of preferably −37° to −52°, more preferably −40° to −50°, particularly preferably −42° to −48°, and most preferably about −45° with respect to the absorption axis of the first polarizer 10. Preferably, the second optical compensation layer 30 is placed so that the slow axis thereof is substantially perpendicular to the slow axis of the first optical compensation layer 20. The respective polarizers and the respective optical compensation layers are placed with the above specific positional relationship, whereby a liquid crystal panel excellent in the balance between the contrast and the viewing angle properties is obtained. Note that in the present specification, the term "substantially perpendicular" includes the case where an angle formed by two optical axes is 90°±2°, and is preferably 90°±1°. Further, in the specification of the present invention, for example, "45°" refers to an angle defined in a counterclockwise direction from a predetermined direction, and "−45°" refers to an angle defined in a clockwise direction from a predetermined direction.

As expressed by the above Expression (1), the difference between the total thickness direction retardation $\Sigma Rth_{1\ to\ n}$ of all the optical compensation layers and the thickness direction retardation $Rth_c$ of the liquid crystal cell in the liquid crystal panel of the present invention is larger than −160 nm and smaller than 50 nm, and preferably larger than −160 nm and smaller than 20 nm. Particular optical compensation layers are placed on both sides of the liquid crystal cell, and the relationship between the thickness direction retardation of the liquid crystal cell and the thickness direction retardations of the optical compensation layers is optimized, whereby a liquid crystal panel remarkably excellent in the balance between the contrast and the viewing angle properties is obtained. In particular, the difference between the total thickness direction retardation of the optical compensation layers and the thickness direction retardation of the liquid crystal cell is set in the above range, whereby a liquid crystal panel is obtained, in which a high contrast is obtained in a wide viewing angle range and the direction in which a high contrast is obtained is not so displaced from a front direction (ultimately, easily viewable for a viewer). In one embodiment, the difference between the total thickness direction retardation of the optical compensation layers and the thickness direction retardation of the liquid crystal cell is preferably −155 nm to −70 nm, and more preferably −140 nm to −80 nm. When the difference is in the above range, the range of a viewing angle in which a high contrast is obtained is remarkably widened. In another embodiment, the difference between the total thickness direction retardation of the optical compensation layers and the thickness direction retardation of the liquid crystal cell is preferably −70 nm to 45 nm, more preferably −70 nm to 20 nm, still more preferably −70 nm to 10 nm, and particularly preferably −60 nm to 10 nm. When the difference is in the above range, a high contrast is obtained from a substantially front direction, which makes it very easy for a viewer to see a display screen image.

B. Liquid Crystal Cell

The liquid crystal cell 40 includes a pair of glass substrates 41, 41', and a liquid crystal layer 42 as a display medium placed between the substrates. On one substrate (active matrix substrate) 41, switching elements (typically, TFTs) for controlling the electrooptical characteristics of liquid crystal, and scanning lines that provide a gate signal to the switching elements and signal lines that give a source signal thereto are provided (both of them are not shown). On the other substrate (color filter substrate) 41', a color filter (not shown) is provided. The color filter may be provided on the active matrix substrate 41. The gap (cell gap) between the substrates 41 and 41' is controlled with spacers (not shown). On each side of the substrates 41 and 41', which is in contact with the liquid crystal layer 42, an alignment film (not shown) made of, for example, polyimide is provided.

Any appropriate drive mode may be employed for the drive mode of the liquid crystal cell 40 as long as the effects of the present invention may be obtained. Specific examples of the drive mode include a super twisted nematic (STN) mode, a twisted nematic (TN) mode, an in-plane switching (IPS) mode, a vertical alignment (VA) mode, an electrically controlled birefringence (ECB) mode, an optically aligned birefringence (OCB) mode, and a hybrid aligned nematic (HAN) mode. Of those, the VA mode, the ECB mode, and the OCB mode are preferred, because a liquid crystal panel excellent in the balance between the contract and the viewing angle properties may be obtained by using any liquid crystal cell of those modes in combination with the optical compensation layer to be used in the present invention.

Figure 2A:
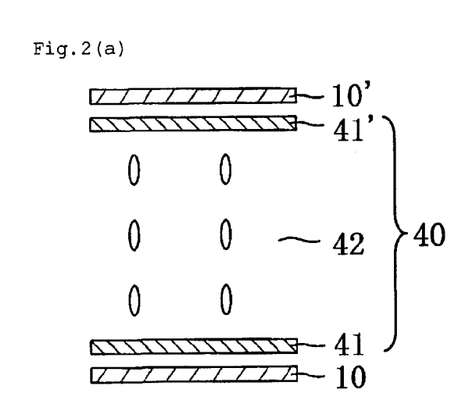
FIG. 2 Schematic cross-sectional views illustrating an alignment state of liquid crystal molecules of a liquid crystal layer in a liquid crystal cell of a VA mode.
Figure 2B:
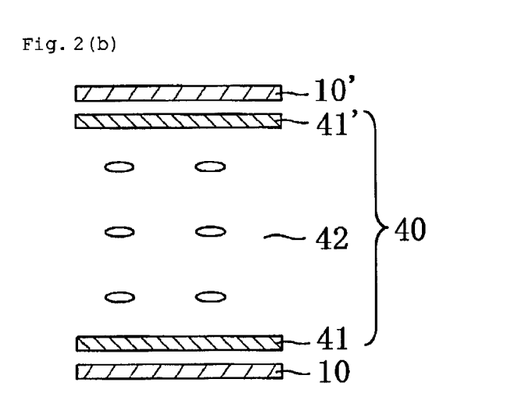

FIG. 2 is a schematic cross-sectional view illustrating an alignment state of liquid crystal molecules in a VA mode. As shown in FIG. 2(*a*), liquid crystal molecules are aligned vertically to the substrates 41, 41' without application of a voltage. Such vertical alignment can be realized by arranging nematic liquid crystal having negative dielectric anisotropy between the substrates each having a vertical alignment film formed thereon (not shown). When linear polarized light which passed through the polarizer 10 enters from a surface of one substrate 41 in such a state, the light enters the liquid crystal layer 42, and the incident light advances along a longitudinal direction of the vertically aligned liquid crystal molecules. No birefringence occurs in the longitudinal direction of the liquid crystal molecules, and thus the incident light advances without changing a polarization direction and is absorbed by the polarizer 10' having an absorption axis perpendicular to that of the polarizer 10. In this way, a dark state is displayed without application of a voltage (normally black mode). As shown in FIG. 2(*b*), longitudinal axes of the liquid crystal molecules are aligned parallel to the substrate surfaces when a voltage is applied between the electrodes. The liquid crystal molecules exhibit birefringence with respect to linear polarized light incident upon the liquid crystal layer 42 in such a state, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the polarizer 10', and a bright state is displayed. Upon termination of voltage application, the display is returned to a dark state by an alignment restraining force. An applied voltage is changed to control inclination of the liquid crystal molecules, so as to change an intensity of light transmission from the polarizer 10'. As a result, display of gradation can be realized.

The thickness direction retardation $Rth_c$ of the liquid crystal cell is preferably 240 to 400 nm, more preferably 270 to 370 nm, and particularly preferably 300 to 340 nm. By using a liquid crystal cell having a thickness direction retardation in the above range in combination with optical compensation layers described later, a liquid crystal panel excellent in the balance between the contrast and the viewing angle properties is obtained.

C. First Optical Compensation Layer

The first optical compensation layer has a refractive index ellipsoid of nx>ny>nz. That is, the first optical compensation layer is a biaxial retardation layer. Further, the in-plane retardation of the first optical compensation layer is 90 to 300 nm.

In one embodiment, the first optical compensation layer can function as a λ/4 plate. In this case, the in-plane retardation $Re_1$ of the first optical compensation layer is preferably 90 to 180 nm, more preferably 100 to 160 nm, and still more preferably 110 to 150 nm. The optical compensation for the liquid crystal cell may be performed appropriately by setting the in-plane retardation value in the above range, and hence a liquid crystal panel may be obtained, which is excellent in the balance between the contrast and the viewing angle properties and has a high contrast ratio in an oblique direction.

In one embodiment, the thickness direction retardation $Rth_1$ of the first optical compensation layer is preferably 80 to 190 nm, more preferably 80 to 165 nm, and still more preferably 80 to 160 nm. In another embodiment, the thickness direction retardation $Rth_1$ of the first optical compensation layer is preferably 100 to 390 nm, more preferably 120 to 370 nm, and still more preferably 150 to 350 nm. The optical compensation for the liquid crystal cell is performed appropriately by setting the thickness direction retardation value in the above range, and hence a liquid crystal panel that is excellent in the balance between the contrast and the viewing angle properties and has a high contrast ratio in an oblique direction may be obtained.

The Nz coefficient of the first optical compensation layer is preferably more than 1.05, more preferably 1.1 or more, and still more preferably 1.15 or more. Further, the Nz coefficient is preferably 2.15 or less, more preferably less than 1.9, still more preferably 1.8 or less, and particularly preferably 1.75 or less. When the Nz coefficient is in the above range, the viewing angle properties may be enhanced. The Nz coefficient is calculated by the following Expression: $Nz=(nx-nz)/(nx-ny)$.

The first optical compensation layer may be formed of any suitable material. Specifically, the first optical compensation layer may be, for example, a polymer film or a coating film.

In one embodiment, the polymer film may be a film obtained by forming a resin such as a polycarbonate-based resin, a norbornene-based resin, a cellulose-based resin, a polyvinyl alcohol-based resin, or a polysulfone-based resin by any suitable forming method. They may be used alone or in combination. Of those, a film obtained by forming a polycarbonate-based resin or a norbornene-based resin by solvent casting method, melt extrusion, or the like may be used preferably. This is because a polymer film excellent in smoothness and optical uniformity may be obtained.

As the above polycarbonate-based resin, an aromatic polycarbonate is preferably used. The aromatic polycarbonate can be typically obtained by the reaction between a carbonate precursor and an aromatic dihydric phenol compound. Specific examples of the carbonate precursor include phosgene, bischloroformate of dihydric phenols, diphenyl carbonate, di-p-tolylcarbonate, phenyl-p-tolylcarbonate, di-p-chlrophenylcarbonate, and dinaphthylcarbonate. Of those, phosgene and diphenylcarbonate are preferred. Specific examples of the aromatic dihydric phenol compound include: 2,2-bis(4-hydroxyphenyl)propane; 2,2-bis(4-hydroxy-3,5-dimethylphenyl)propane; bis(4-hydroxyphenyl)methane; 1,1-bis(4-hydroxyphenyl)ethane; 2,2-bis(4-hydroxyphenyl)butane; 2,2-bis(4-hydroxy-3,5-dimethylphenyl)butane; 2,2-bis(4-hydroxy-3,5-dipropylphenyl)propane; 1,1-bis(4-hydroxyphenyl)cyclohexane; and 1,1-bis(4-hydroxyphenyl)-3,3,5-trimethylcyclohexane. They may be used alone or in combination. Preferred are: 2,2-bis(4-hydroxyphenyl)propane; 1,1-bis(4-hydroxyphenyl)cyclohexane; and 1,1-bis(4-hydroxyphenyl)-3,3,5-trimethylcyclohexane. In particular, 2,2-bis(4-hydroxyphenyl)propane and 1,1-bis(4-hydroxyphenyl)-3,3,5-trimethylcyclohexane are preferably used in combination.

The above norbornene-based resin is obtained by polymerizing a norbornene-based monomer as a polymerization unit. Examples of the norbornene-based monomer include: norbornene, and its alkyl and/or alkylidene-substituted monomers such as 5-methyl-2-norbornene, 5-dimethyl-2-norbornene, 5-ethyl-2-norbornene, 5-butyl-2-norbornene, 5-ethylidene-2-norbornene, and substituted monomers of norbornene and its alkyl and/or alkylidene-substituted monomers with a polar group such as halogen; dicyclopentadiene, 2,3-dihydrodicyclopentadiene, or the like; dimethanooctahydronaphthalene, its substituted monomers with alkyl and/or alkylidene, and its substituted monomers with a polar group such as halogen, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethyliden-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; and a trimer or tetramer of cyclopentadiene such as 4,9:5,8-dimethano-3a,4,4a,5,8,8a,9,9a-octahydro-1H-benzoindene, or 4,11:5,10:6,9-trimethano-3a,4,4a,5,5a,6,9,9a,10,10a,11,11a-dodecahydro-1 H-cyclopentaanthracene. The above norbornene-based resin may be a copolymer of a norbornene-based monomer and another monomer.

The above polymer film may further contain any suitable additive. Examples of the additive include a plasticizer, a thermal stabilizer, a light stabilizer, a lubricant, an antioxidant, a UV absorber, a flame retardant, a colorant, an antistatic agent, a compatibilizing agent, a cross-linking agent, and a thickener. The content of the additive is preferably more than 0 to 10 or less parts by weight with respect to 100 parts by weight of the above resin.

Any suitable commercially-available product may be used as the above polymer film.

In one embodiment, the above coating film may be formed of a resin such as a polyamide-based resin, a polyimide-based resin, a polyester-based resin, a polyether ketone-based resin, a polyamide imide-based resin, or a polyester imide-based resin. Those resins may be used alone, or may be used as a mixture of two or more kinds of resins having different functional groups, for example, as a mixture of polyaryletherketone and polyamide. Of those, the polyimide-based resin may be preferably used in view of its high transparency, high aligning property, and high stretching property.

Specific examples of the resins that can form the above coating film may include those resins described in JP 2006-317495 A.

The coating film can further contain any suitable additive. The additive and the content thereof are similar to those which may be contained in the polymer film.

An example of the method of forming a coating film from the resin includes a method of applying a solution of the resin to any suitable base film and removing a solvent from the solution. A specific example of the method includes a method described in JP 2006-317495 A.

Typically, a first optical compensation layer having the above-mentioned optical properties (for example, refractive index profile, in-plane retardation, thickness direction retardation, Nz coefficient) may be formed by stretching the polymer film or the coating film. The stretching conditions may be selected appropriately depending upon a material for forming the polymer film or the coating film, the thickness of the polymer film or the coating film, the optical properties desired for the first optical compensation layer, and the like.

For example, when the polymer film contains a norbornene-based resin, the stretching temperature is preferably 130 to 170° C. and more preferably 135 to 165° C. The stretching ratio is, for example, 1.1 to 2.8 times, preferably 1.2 to 2.8 times, and more preferably 1.3 to 2.5 times. An example of the stretching method includes transverse uniaxial stretching (fixed-end biaxial stretching). When the first optical compensation layer is a stretched polymer film, the thickness of the first optical compensation layer is typically 20 to 80 μm, preferably 30 to 70 μm, and more preferably 40 to 60 μm.

For example, when the coating film contains a polyimide-based resin, a method of stretching or shrinking the base film and the coating film formed on the base film together may be typically used. In a preferred embodiment, stretching or shrinking is performed at a predetermined heating temperature. The heating temperature (stretching temperature) is, for example, 130 to 170° C., and the stretching ratio is, for example, 1.3 to 2.5 times and preferably 1.5 to 2.0 times. An example of the stretching method includes transverse uniaxial stretching (fixed-end biaxial stretching). When the first optical compensation layer is a stretched coating film, the thickness of the first optical compensation layer is typically 0.1 to 10 μm, preferably 0.5 to 8 μm, and more preferably 1 to 5 μm.

Referring to FIG. 1, the first optical compensation layer 20 is placed between the first polarizer 10 and the liquid crystal cell 40. As a method of placing the first optical compensation layer, any suitable method may be adopted depending upon the purpose. Typically, a pressure-sensitive adhesive layer (not shown) is provided on the liquid crystal cell 40 side of the first optical compensation layer 20 and the first optical compensation layer 20 is attached to the liquid crystal cell. After that, a pressure-sensitive adhesive layer (not shown) is provided on the first polarizer 10 side of the first optical compensation layer 20, and the first polarizer 10 is attached to the first optical compensation layer 20. Alternatively, the first polarizer 10 and the first optical compensation layer 20 may be attached to each other to form a laminate, and then the laminate may be attached to the liquid crystal cell.

D. Second Optical Compensation Layer

The second optical compensation layer has a refractive index ellipsoid of nx>ny>nz and an in-plane retardation $Re_2$ of 90 to 300 nm. The details of the second optical compensation layer such as the optical properties thereof, the materials for forming thereof, and the method of forming thereof are as described in the section C regarding the first optical compensation layer, and hence the descriptions thereof is omitted. In a preferred embodiment, the thickness direction retardation $Rth_2$ of the second optical compensation layer is 80 to 190 nm, preferably 80 to 165 nm, and more preferably 80 to 160 nm. Preferably, the second optical compensation layer is formed of the same material as that for the first optical compensation layer, and has the same thickness as that of the first optical compensation layer.

Referring to FIG. 1, the second optical compensation layer 30 is placed between the second polarizer 10' and the liquid crystal cell 40. As a method of placing the second optical compensation layer, the same method as that of placing the first optical compensation layer may be used.

E. Polarizer

As the first polarizer 10 and the second polarizer 10', any suitable polarizers may be employed depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 1 to 80 μm. The first polarizer 10 and the second polarizer 10' may be identical or different.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

F. Protective Film

As the protective film, any appropriate film which can be used as a protective film of a polarizing plate may be employed. Specific examples of a material used as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, an acrylic resin, and an acetate-based resin. Another example thereof includes an acrylic, urethane-based, acrylic urethane-based, epoxy-based, or silicone-based thermosetting resin or UV-curing resin. Still another example thereof includes a glassy polymer such as a siloxane-based polymer. Further, a polymer film described in JP 2001-343529 A (WO 01/37007) may also be used. To be specific, the film is formed of a resin composition containing a thermoplastic resin having a substituted or unsubstituted imide group on a side chain, and a thermoplastic resin having a substituted or unsubstituted phenyl group and a nitrile group on a side chain. A specific example thereof includes a resin composition containing an alternate copolymer of isobutene and N-methylmaleimide, and an acrylonitrile/styrene copolymer. The polymer film may be an extruded product of the above-mentioned resin composition, for example. Of those, TAC, a polyimide-based resin, a polyvinyl alcohol-based resin, and a glassy polymer are preferable, and TAC is more preferable.

It is preferable that the protective film be transparent and have no color. Further, it is preferable that the protective film provided between a polarizer and an optical compensation layer substantially has optical isotropy. In one embodiment, the protective film provided between a polarizer and an optical compensation layer has an in-plane retardation of 0 to 10 nm and a thickness direction retardation of 0 to 10 nm.

As a thickness of the protective film, any appropriate thickness can be adopted. To be specific, the thickness of the protective film is preferably 5 mm or less, more preferably 1 mm or less, particularly preferable 1 to 500 μm, and most preferably 5 to 150 μm.

The protective film provided on the outer side of the polarizers 10 and 10' (that is, the opposite side to the optical compensation layer) may be subjected to hard coat treatment, antireflection treatment, anti-sticking treatment, anti-glare treatment, or the like as required.

G. Pressure-Sensitive Adhesive Layer

As a pressure-sensitive adhesive forming a pressure-sensitive adhesive layer, any appropriate pressure-sensitive adhesive can be adopted. Specific examples thereof include a solvent type pressure-sensitive adhesive, a non-aqueous emulsion type pressure-sensitive adhesive, an aqueous pressure-sensitive adhesive, and a hotmelt pressure-sensitive adhesive. Of those, a solvent type pressure-sensitive adhesive containing an acrylic polymer as a base polymer is preferably used.

The thickness of the above pressure-sensitive adhesive layer can be appropriately set depending upon the use purpose, the adhesion strength, and the like. Specifically, the thickness of the pressure-sensitive adhesive layer is preferably 1 μm to 100 μm, more preferably 5 μm to 50 μm, and still more preferably 10 μm to 30 μm.

H. Adhesive Layer

As an adhesive forming an adhesive layer, typically, there is a curable adhesive. Typical examples of the curable adhesive include a photo-curable adhesive such as a UV-curable adhesive, a moisture-curable adhesive, and a thermosetting adhesive.

The applying amount of an adhesive between respective layers can be set appropriately depending upon the purpose. For example, the applying amount is preferably 0.3 to 3 ml, more preferably 0.5 to 2 ml, and still more preferably 1 to 2 ml per area ($cm^2$) with respect to a principal plane of each layer.

After applying, a solvent contained in the adhesive is volatilized by natural drying or heat drying, if required. The thickness of the adhesive layer thus obtained is preferably 0.1 to 20 μm, more preferably 0.5 to 15 μm, and still more preferably 1 to 10 μM.

The above pressure-sensitive adhesive or adhesive can be selected appropriately depending upon the kind of an adherend (optical element).

I. Another Optical Element in a Liquid Crystal Panel

The liquid crystal panel of the present invention may further include another optical element. As such another optical element, any suitable optical element may be adopted depending upon the purpose and the kind of the liquid crystal panel. Specific examples thereof include a liquid crystal film, a light scattering film, a diffraction film, and another optical compensation layer (retardation film).

Each of the optical elements in the liquid crystal panel of the present invention may be subjected to treatment with a UV absorbing agent such as a salicylic ester-based compound, a benzophenone-based compound, a benzotriazole-based compound, a cyanoacrylate-based compound, or a nickel complex salt-based compound, to thereby impart UV absorbing property.

J. Liquid Crystal Display Apparatus

As described above, the liquid crystal panel of the present invention may be also applied preferably to any of transmission-type, reflection-type, and semi-transmission-type liquid crystal display apparatuses. For example, in the case of a transmission-type liquid crystal display apparatus, a brightness enhancement film, a prism sheet, a light guide plate, a backlight, and the like are provided on a reverse side (opposite side of the viewer side) of the liquid crystal panel of the present invention. Examples of the liquid crystal display apparatus including the liquid crystal display panel of the present invention include a personal computer, a liquid crystal television, a mobile telephone, and a personal digital assistant (PDA).

Hereinafter, the present invention is described more specifically by way of examples; however, the present invention is not limited to those examples. The methods of measuring the respective properties in the examples are as follows.

(1) Measurement of Thickness

The thicknesses of polarizing plates each with an optical compensation layer in examples and comparative examples were measured using DIAL GAUGE manufactured by Ozaki Mfg. Co. Ltd.

(2) Measurement of Contrast

A computer simulation was conducted regarding the liquid crystal panels in the respective examples and comparative examples, using the optical properties parameters of the respective optical compensation layers produced and measured actually. For the simulation, a simulator for a liquid crystal display unit "LCD MASTER" manufactured by SHINTEC Co., Ltd. was used.

(3) Measurement of in-Plane Retardation and Thickness Direction Retardation

The values of the in-plane retardation and the thickness direction retardation at a wavelength of 590 nm and 23° C. were measured using a retardation measurement apparatus "KOBRA21-ADH" (trade name) manufactured by Oji Scientific Instruments) employing a parallel Nicols rotation method as a principle.

EXAMPLE 1

Liquid Crystal Cell

A VA-mode liquid crystal cell mounted on Play Station Portable (PSP) (trade name) manufactured by Sony Corporation was used. The thickness direction retardation $Rth_c$ of the liquid crystal cell was 320 nm.

(Production of Polarizing Plate)

A commercially-available polyvinyl alcohol film (manufactured by Kurary Co., Ltd.) was dyed in an aqueous solution containing iodine, and uniaxially stretched by 6 times between rolls having different velocities in an aqueous solution containing boric acid to thereby obtain a polarizer. Triacetylcellulose films (thickness: 40 μm, KC4UYW (tradename) manufactured by Konica Minolta Opto, Inc.), as protective films, were attached on both surfaces of the polarizer with a polyvinyl alcohol-based adhesive (thickness: 0.1 μm), whereby a polarizing plate was obtained. The in-plane retardation Re (550) of the protective film was 0.9 nm. Re (550) represents a value measured with light having a wavelength of 550 nm at 23° C.

(Production of First Optical Compensation Layer)

A long-shaped norbornene-based resin film (Zeonor (tradename) manufactured by Nippon Zeon Co., Ltd., thickness: 60 Ξm, photoelastic coefficient: $3.1×10^{-12}$ $m^2/N$) was subjected to fixed-end biaxial stretching by 1.85 times at 150°

C., whereby a long-shaped film was produced. The film thus obtained was punched to a size corresponding to the liquid crystal cell to obtain a first optical compensation layer. The obtained film had a refractive index ellipsoid of nx>ny>nz, an in-plane retardation $Re_1$ of 140 nm, a thickness direction retardation $Rth_1$ of 84 nm, and an Nz coefficient of 1.1.

(Production of Second Optical Compensation Layer)

A second optical compensation layer ($Re_2$: 140 nm, $Rth_2$: 84 nm, Nz coefficient: 1.1) was obtained in the same way as in the first optical compensation layer.

(Production of Liquid Crystal Panel)

The polarizing plate and the second optical compensation layer obtained as described above were laminated via an acrylic pressure-sensitive adhesive (thickness: 12 μm), whereby a laminated film A was produced. Herein, the polarizing plate and the second optical compensation layer were laminated so that the slow axis of the second optical compensation layer formed an angle of 45° with respect to the absorption axis of the polarizer of the polarizing plate.

The polarizing plate and the first optical compensation layer obtained as described above were laminated via an acrylic pressure-sensitive adhesive (thickness: 12 μm), whereby a laminated film B was produced. Herein, the polarizing plate and the first optical compensation layer were laminated so that the slow axis of the first optical compensation layer formed an angle of 45° with respect to the absorption axis of the polarizer of the polarizing plate.

The laminated film A was attached to the viewer side of the liquid crystal cell removed from the PSP via an acrylic pressure-sensitive adhesive (thickness: 20 μm). At this time, the laminated film A was attached so that the second optical compensation layer was placed on the liquid crystal cell side. Next, the laminated film B was attached to the backlight side of the liquid crystal cell via an acrylic pressure-sensitive adhesive (thickness: 20 μm). At this time, the laminated film B was attached so that the first optical compensation layer was placed on the liquid crystal cell side. Further, the lamination was performed so that the absorption axis of the polarizer of the laminated film A and the absorption axis of the polarizer of the laminated film B were substantially perpendicular to each other. Specifically, the lamination was performed so that the slow axis of the first optical compensation layer formed an angle of 45°, the slow axis of the second optical compensation layer formed an angle of 135°, and the absorption axis of the polarizer on the viewer side formed an angle of 90° in a counterclockwise direction with respect to the absorption axis of the polarizer on the backlight side as the standard (0°). Thus, a liquid crystal panel was obtained.

Figure 3:
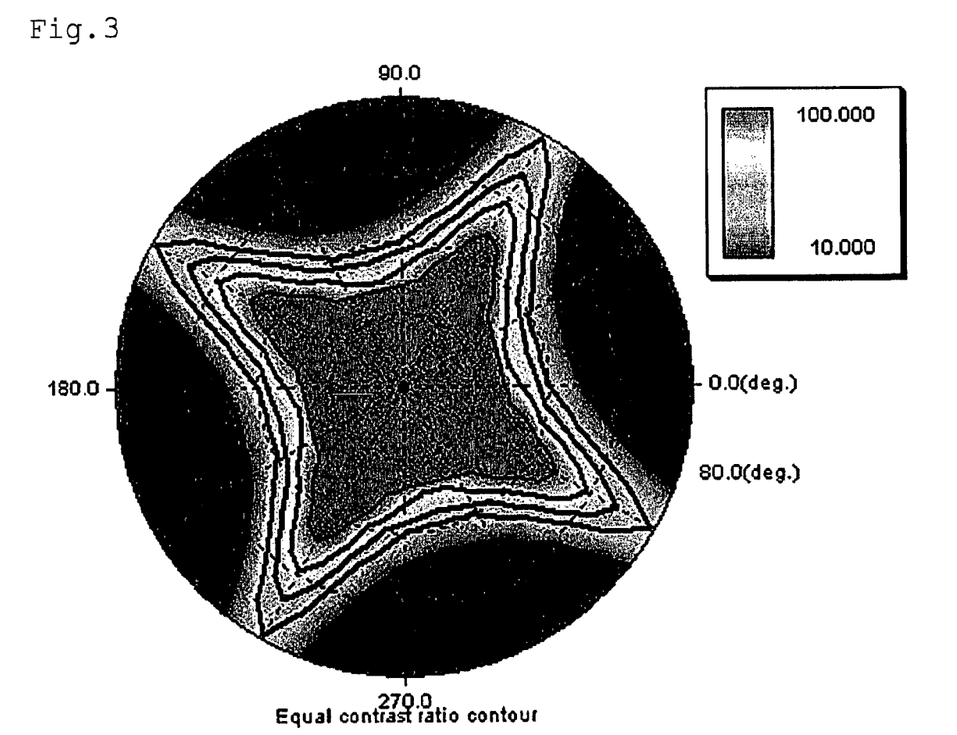
FIG. 3 The results of a computer simulation regarding viewing angle dependence of a contrast of a liquid crystal panel produced in Example 1.

A computer simulation was conducted regarding the viewing angle dependence of a contrast of a liquid crystal display apparatus using the obtained liquid crystal panel. FIG. 3 shows the results. Note that the difference between the total thickness direction retardation $\Sigma Rth_{1\,to\,2}$ of all the optical compensation layers in the liquid crystal panel and the thickness direction retardation $Rth_c$ of the liquid crystal cell was −152 nm.

EXAMPLE 2

A liquid crystal panel was produced in the same way as in Example 1 except that the stretching ratio of the film was set to be 1.75 times when producing the first and second optical compensation layers. The first and second optical compensation layers each had a refractive index ellipsoid of nx>ny>nz, an in-plane retardation Re of 140 nm, a thickness direction retardation Rth of 91 nm, and an Nz coefficient of 1.15.

Figure 4:
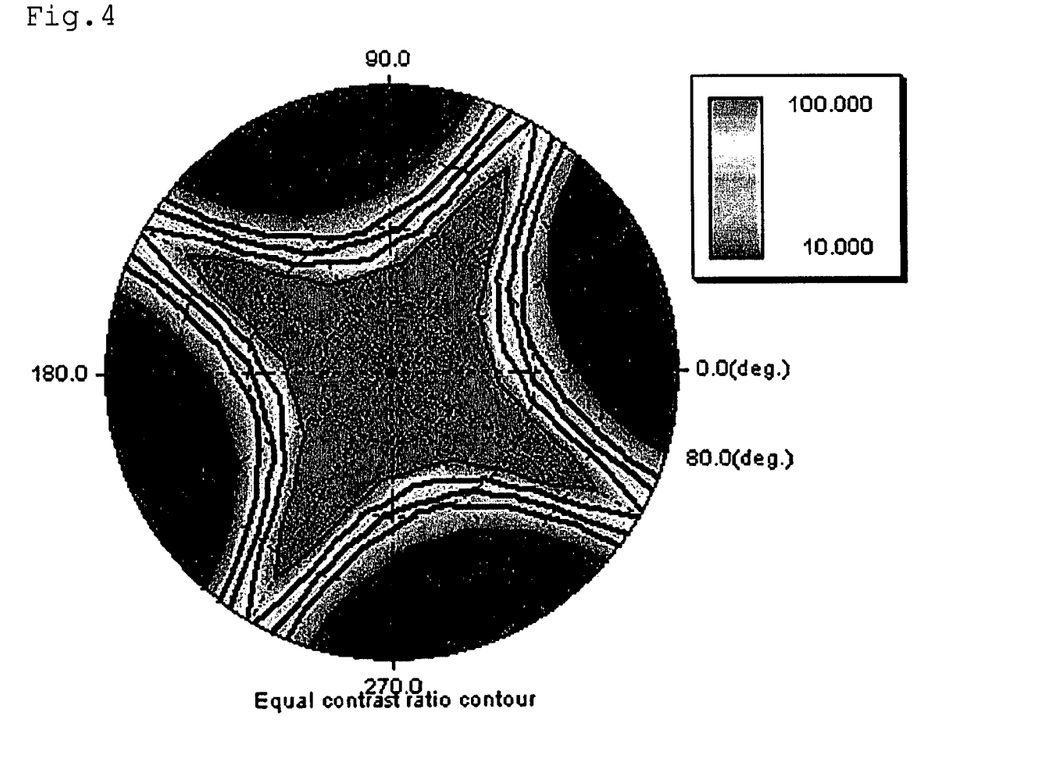
FIG. 4 The results of a computer simulation regarding viewing angle dependence of a contrast of a liquid crystal panel produced in Example 2.

A computer simulation was conducted regarding the viewing angle dependence of a contrast of a liquid crystal display apparatus using the obtained liquid crystal panel. FIG. 4 shows the results. Note that the difference between the total thickness direction retardation $\Sigma Rth_{1\,to\,2}$ of all the optical compensation layers in the liquid crystal panel and the thickness direction retardation $Rth_c$ of the liquid crystal cell was −138 nm.

EXAMPLE 3

A liquid crystal panel was produced in the same way as in Example 1 except that the stretching ratio of the film was set to be 1.5 times when producing the first and second optical compensation layers. The first and second optical compensation layers each had a refractive index ellipsoid of nx>ny>nz, an in-plane retardation Re of 140 nm, a thickness direction retardation Rth of 112 nm, and an Nz coefficient of 1.3.

Figure 5:
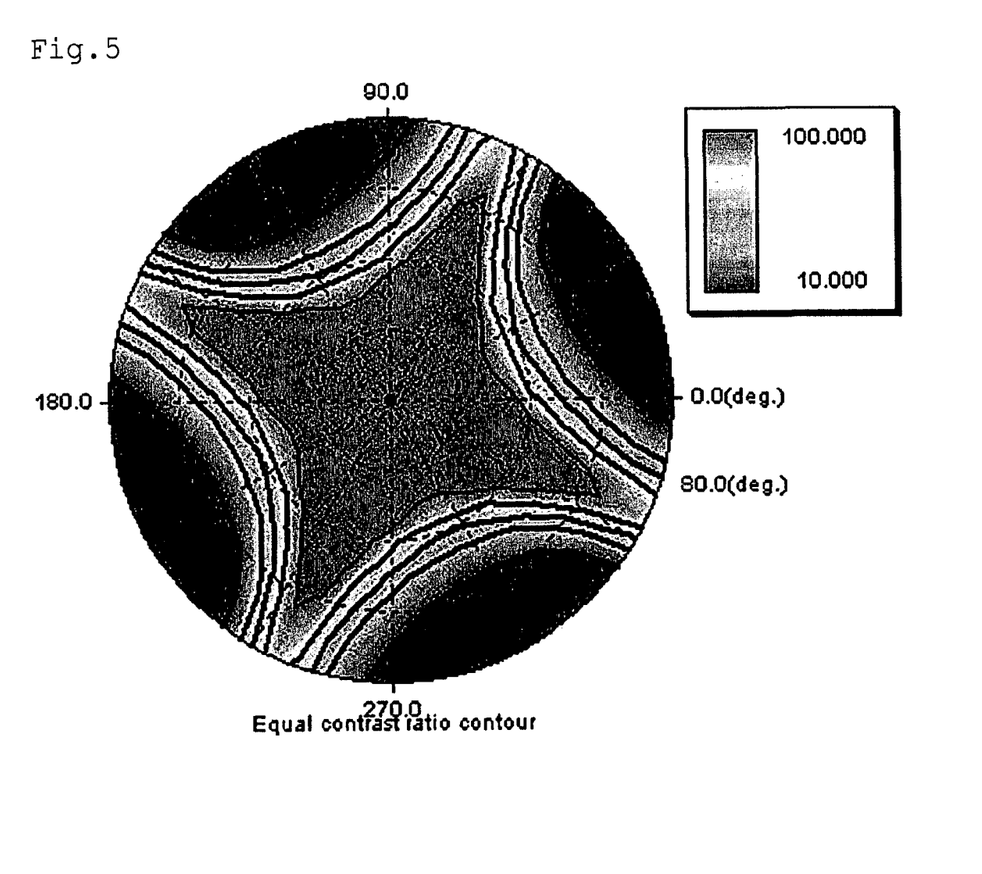
FIG. 5 The results of a computer simulation regarding viewing angle dependence of a contrast of a liquid crystal panel produced in Example 3.

A computer simulation was conducted regarding the viewing angle dependence of a contrast of a liquid crystal display apparatus using the obtained liquid crystal panel. FIG. 5 shows the results. Note that the difference between the total thickness direction retardation $\Sigma Rth_{1\,to\,2}$ of all the optical compensation layers in the liquid crystal panel and the thickness direction retardation $Rth_c$ of the liquid crystal cell was −96 nm.

EXAMPLE 4

A liquid crystal panel was produced in the same way as in Example 1 except that the stretching ratio of the film was set to be 1.3 times when producing the first and second optical compensation layers. The first and second optical compensation layers each had a refractive index ellipsoid of nx>ny>nz, an in-plane retardation Re of 140 nm, a thickness direction retardation Rth of 140 nm, and an Nz coefficient of 1.5.

Figure 6:
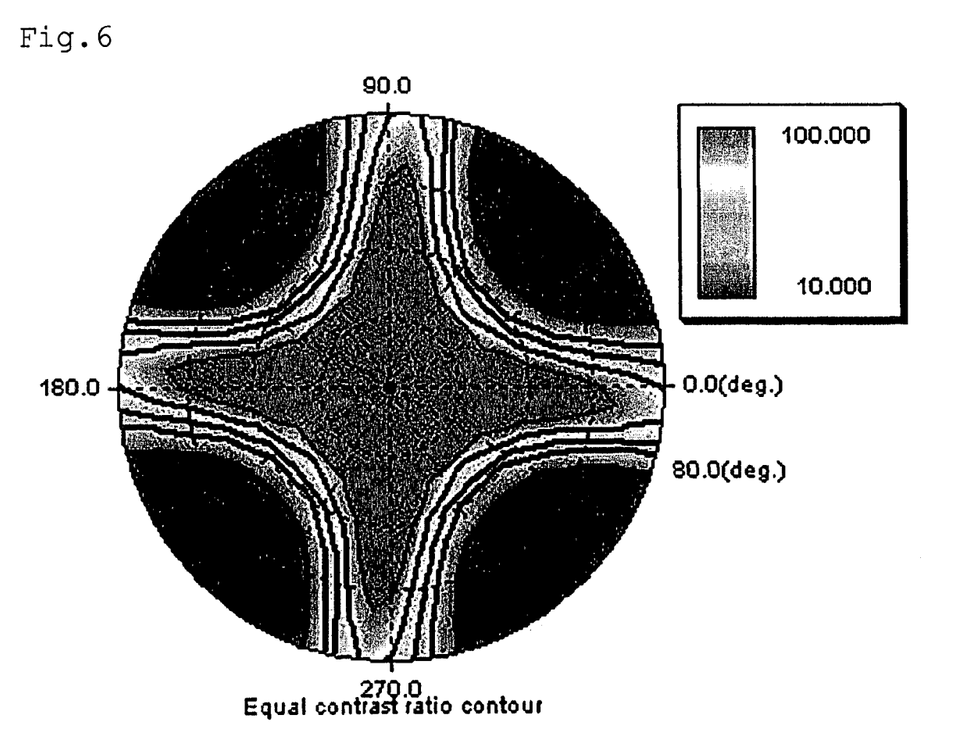
FIG. 6 The results of a computer simulation regarding viewing angle dependence of a contrast of a liquid crystal panel produced in Example 4.

A computer simulation was conducted regarding the viewing angle dependence of a contrast of a liquid crystal display apparatus using the obtained liquid crystal panel. FIG. 6 shows the results. Note that the difference between the total thickness direction retardation $\Sigma Rth_{1\,to\,2}$ of all the optical compensation layers in the liquid crystal panel and the thickness direction retardation $Rth_c$ of the liquid crystal cell was −40 nm.

EXAMPLE 5

A liquid crystal panel was produced in the same way as in Example 1 except that the stretching ratio of the film was set to be 1.15 times when producing the first and second optical compensation layers. The first and second optical compensation layers each had a refractive index ellipsoid of nx>ny>nz, an in-plane retardation Re of 140 nm, a thickness direction retardation Rth of 182 nm, and an Nz coefficient of 1.8.

Figure 7:
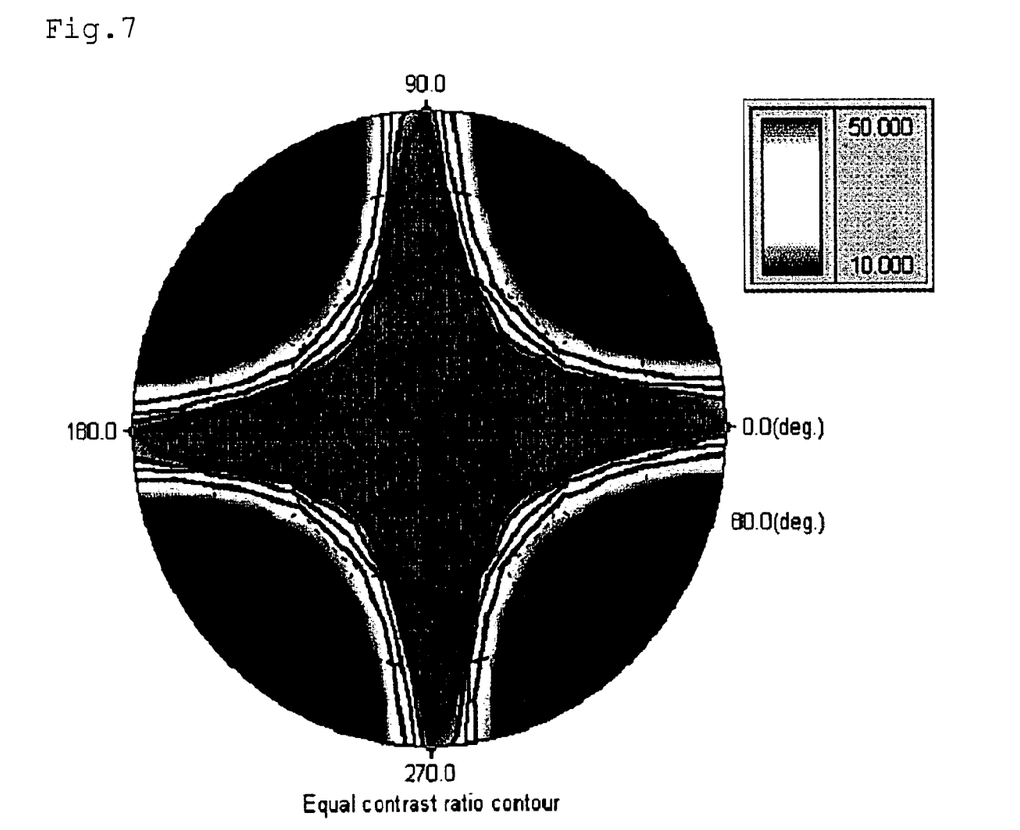
FIG. 7 The results of a computer simulation regarding viewing angle dependence of a contrast of a liquid crystal panel produced in Example 5.

A computer simulation was conducted regarding the viewing angle dependence of a contrast of a liquid crystal display apparatus using the obtained liquid crystal panel. FIG. 7 shows the results. Note that the difference between the total thickness direction retardation $\Sigma Rth_{1\,to\,2}$ of all the optical compensation layers in the liquid crystal panel and the thickness direction retardation $Rth_c$ of the liquid crystal cell was 44 nm.

COMPARATIVE EXAMPLE 1

A liquid crystal panel was produced in the same way as in Example 1 except that the stretching ratio of the film was set to be 2 times when producing the first and second optical compensation layers. The first and second optical compensation layers each had a refractive index ellipsoid of nx>ny>nz, an in-plane retardation Re of 140 nm, a thickness direction retardation Rth of 77 nm, and an Nz coefficient of 1.05.

Figure 8:
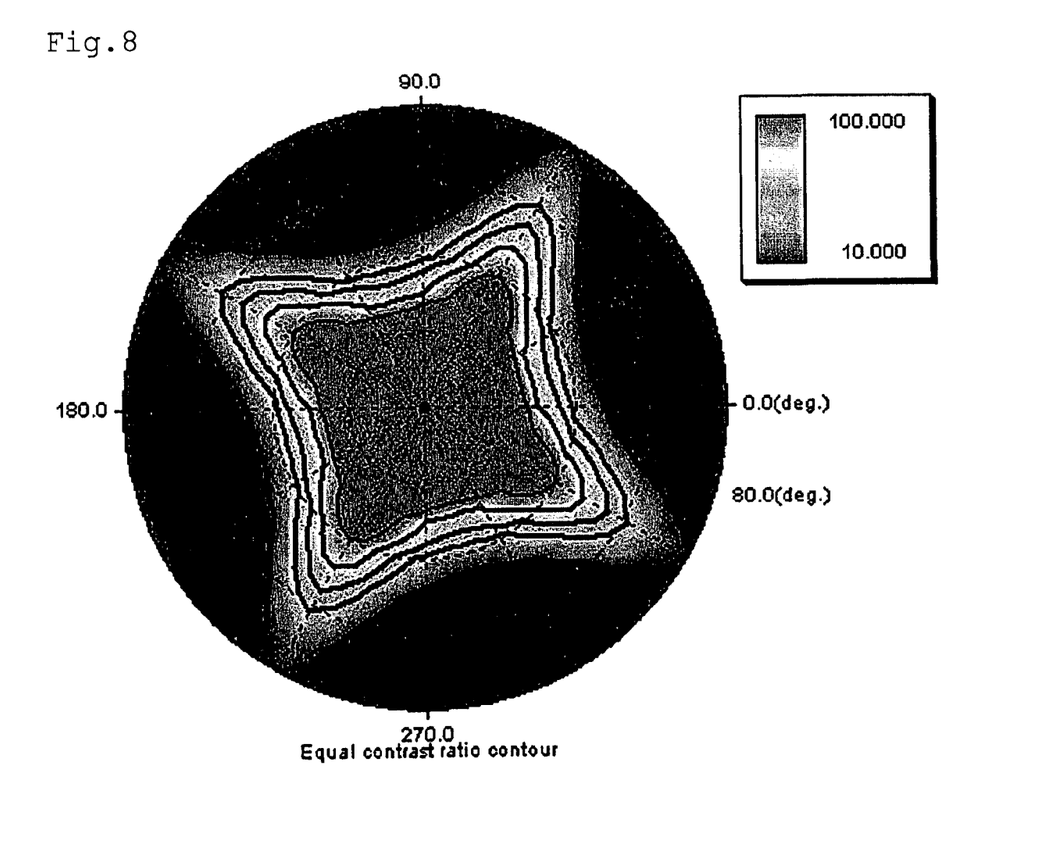
FIG. 8 The results of a computer simulation regarding viewing angle dependence of a contrast of a liquid crystal panel produced in Comparative Example 1.

A computer simulation was conducted regarding the viewing angle dependence of a contrast of a liquid crystal display apparatus using the obtained liquid crystal panel. FIG. 8 shows the results. Note that the difference between the total thickness direction retardation $\Sigma Rth_{1\ to\ 2}$ of all the optical compensation layers in the liquid crystal panel and the thickness direction retardation $Rth_c$ of the liquid crystal cell was −166 nm.

COMPARATIVE EXAMPLE 2

A liquid crystal panel was produced in the same way as in Example 1 except that the stretching ratio of the film was set to be 1.05 times when producing the first and second optical compensation layers. The first and second optical compensation layers each had a refractive index ellipsoid of nx>ny>nz, an in-plane retardation Re of 140 nm, a thickness direction retardation Rth of 196 nm, and an Nz coefficient of 1.9.

Figure 9:
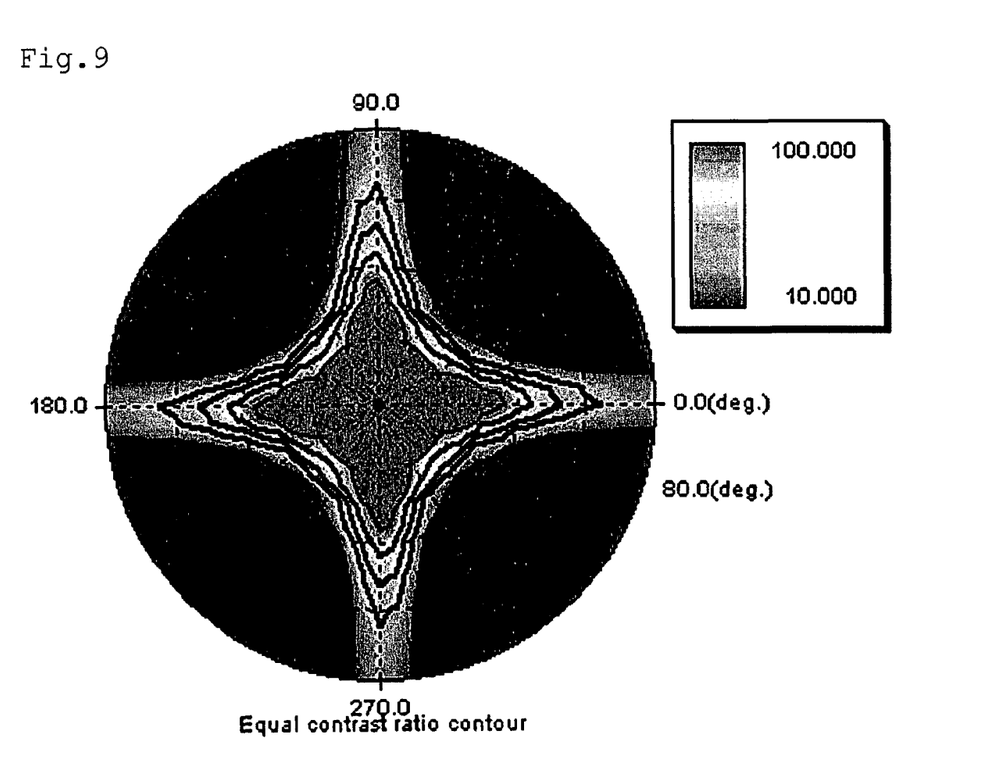
FIG. 9 The results of a computer simulation regarding viewing angle dependence of a contrast of a liquid crystal panel produced in Comparative Example 2.

A computer simulation was conducted regarding the viewing angle dependence of a contrast of a liquid crystal display apparatus using the obtained liquid crystal panel. FIG. 9 shows the results. Note that the difference between the total thickness direction retardation $\Sigma Rth_{1\ to\ 2}$ of all the optical compensation layers in the liquid crystal panel and the thickness direction retardation $Rth_c$ of the liquid crystal cell was 72 nm.

COMPARATIVE EXAMPLE 3

A liquid crystal panel was produced in the same way as in Example 1 except that the stretching ratio of the film was set to be 1.02 times when producing the first and second optical compensation layers. The first and second optical compensation layers each had a refractive index ellipsoid of nx>ny>nz, an in-plane retardation Re of 140 nm, a thickness direction retardation Rth of 210 nm, and an Nz coefficient of 2.0.

Figure 10:
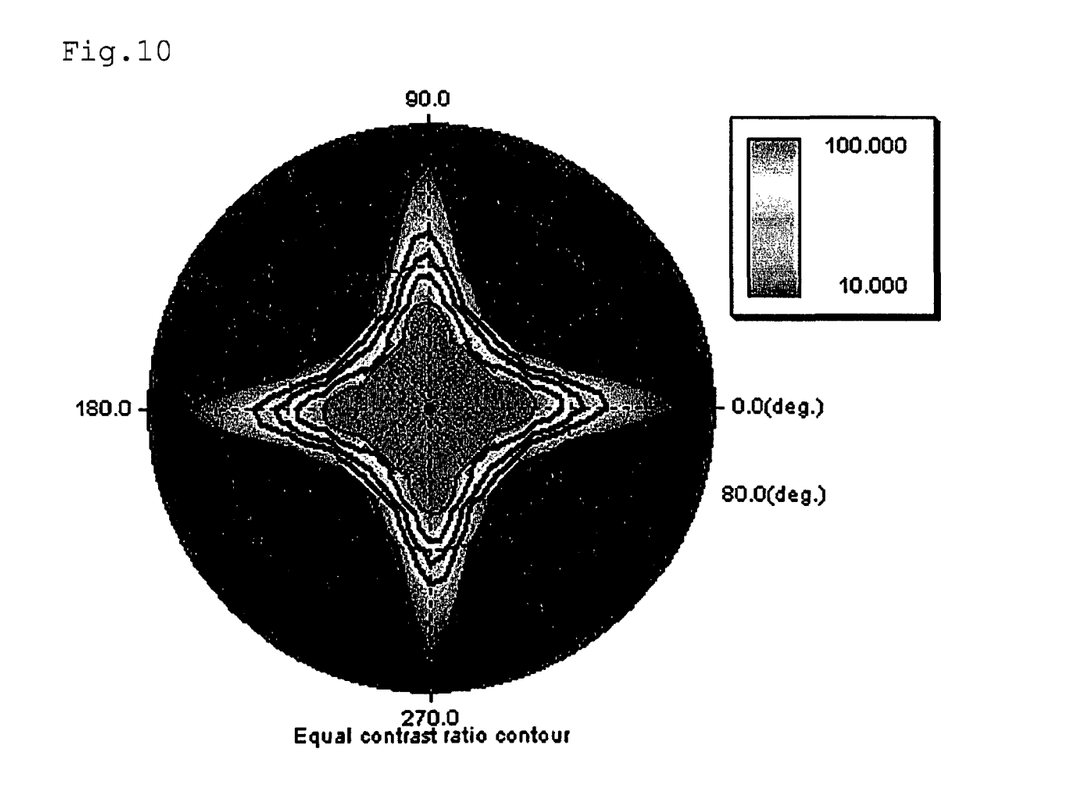
FIG. 10 The results of a computer simulation regarding viewing angle dependence of a contrast of a liquid crystal panel produced in Comparative Example 3.

A computer simulation was conducted regarding the viewing angle dependence of a contrast of a liquid crystal display apparatus using the obtained liquid crystal panel. FIG. 10 shows the results. Note that the difference between the total thickness direction retardation $\Sigma Rth_{1\ to\ 2}$ of all the optical compensation layers in the liquid crystal panel and the thickness direction retardation $Rth_c$ of the liquid crystal cell was 100 nm.

FIGS. 3 to 10 are contrast contour maps. The contours in FIGS. 3 to 6 and 8 to 10 are 100, 50, 30, 20, and 10 in the stated order from the center, and the contours in FIG. 7 are 50, 40, 30, 20, and 10 in the stated order from the center. As shown in FIGS. 3 to 10, when the difference between the total thickness direction retardation $\Sigma Rth_{1\ to\ n}$ of all the optical compensation layers in the liquid crystal panel and the thickness direction retardation $Rth_c$ of the liquid crystal cell is in a predetermined range, the liquid crystal panel to be obtained has a remarkably excellent balance between the contrast and the viewing angle properties.

INDUSTRIAL APPLICABILITY

The liquid crystal panel and the liquid crystal display apparatus of the present invention may preferably be applied to a personal computer, a liquid crystal television, a mobile telephone, a personal digital assistant (PDA), etc.

The invention claimed is:

1. A liquid crystal panel, comprising, in the following order toward a viewer side:
    a first polarizer;
    a first optical compensation layer having a refractive index ellipsoid of nx>ny>nz and an in-plane retardation $Re_1$ of 90 to 300 nm;
    a liquid crystal cell;
    a second optical compensation layer having a refractive index ellipsoid of nx>ny>nz and an in-plane retardation $Re_2$ of 90 to 300 nm; and
    a second polarizer,
    wherein a total thickness direction retardation $\Sigma Rth_{1\ to\ n}$ of all the optical compensation layers and a thickness direction retardation $Rth_c$ of the liquid crystal cell satisfy the following Expression (1):

$$-160 \text{ nm} < (\Sigma Rth_{1\ to\ n} - Rth_c) < 50 \text{ nm} \qquad (1).$$

2. A liquid crystal panel according to claim 1, wherein the total thickness direction retardation $\Sigma Rth_{1\ to\ n}$ of all the optical compensation layers and the thickness direction retardation $Rth_c$ of the liquid crystal cell satisfy the following Expression (2):

$$-160 \text{ nm} < (\Sigma Rth_{1\ to\ n} - Rth_c) < 20 \text{ nm} \qquad (2).$$

3. A liquid crystal panel according to claim 1, wherein the liquid crystal cell is in a VA mode.

4. A liquid crystal display apparatus comprising the liquid crystal panel according to claim 1.

5. A liquid crystal panel according to claim 2, wherein the liquid crystal cell is in a VA mode.

6. A liquid crystal display apparatus comprising the liquid crystal panel according to claim 2.

7. A liquid crystal display apparatus comprising the liquid crystal panel according to claim 5.

* * * * *